C. W. WARNER.
TROLLEY HEAD.
APPLICATION FILED FEB. 26, 1914.
1,116,652.
Patented Nov. 10, 1914.
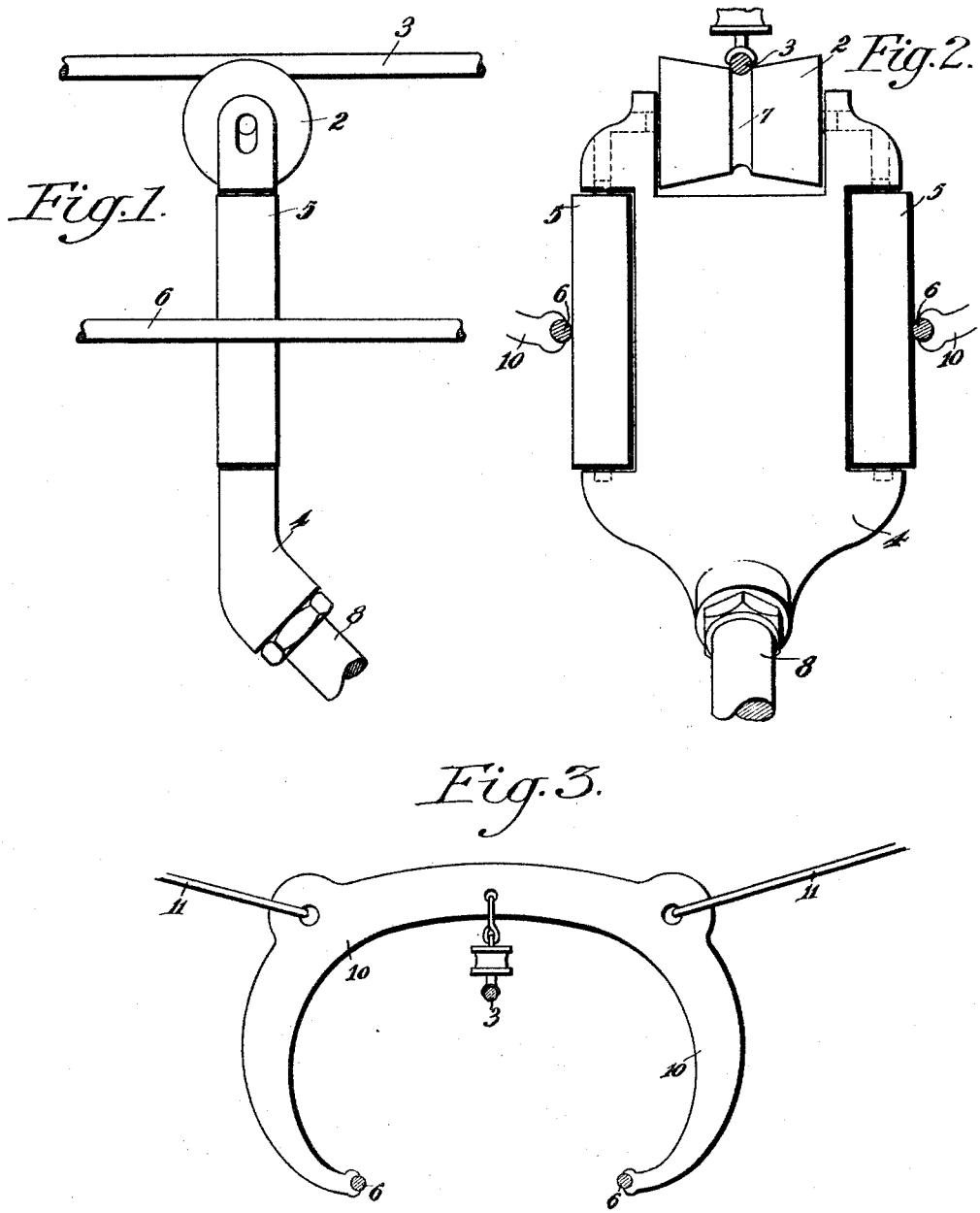

UNITED STATES PATENT OFFICE.

CLYDE W. WARNER, OF VANCOUVER, BRITISH COLUMBIA, CANADA.

TROLLEY-HEAD.

1,116,652.      Specification of Letters Patent.      Patented Nov. 10, 1914.

Application filed February 26, 1914. Serial No. 821,256.

*To all whom it may concern:*

Be it known that I, CLYDE W. WARNER, a citizen of the United States, residing at Vancouver, in the Province of British Columbia, Canada, have invented certain new and useful Improvements in Trolley-Heads, of which the following is a specification.

This invention relates to a trolley head for the pole of an electric car and is designed to retain the trolley wheel against lateral displacement from the wire from which the current is derived.

The invention is particularly described in the following specification, reference being made to the drawings by which it is accompanied, in which:

Figure 1 is a side elevation of the trolley head. Fig. 2, a front view of the same, and Fig. 3, an end view showing the manner of maintaining the guide wires in position in relation to the trolley or current wire.

In these drawings 3 represents the trolley wire and 8 the trolley pole.

Secured on the upper end of the trolley pole 8 is a light head member 4 which carries the trolley wheel or roller 2 through which current is conducted to the car from the trolley wire 3. This wheel 2 instead of being deeply grooved, as is usual, to retain it on the wire 3, is of substantial width, say from four to six inches, and is tapered smaller from each side toward the middle, where a slight circumferential groove 7 is formed in it for the wire 3. This wheel 2 is mounted to rotate on a spindle secured in the head 4, and cylindrical side rollers 6 are similarly mounted on each side, the axis of rotation of the side rollers being at right angles to that of the trolley wheel 2. The attachment of the trolley head 4 to the trolley pole 8 is at such an angle that the side rollers will be substantially vertical at the normal angle of backward rake of the trolley pole. This trolley head is designed to be used with a trolley wire 3 having a guide wire 6 on each side and below it that will prevent lateral movement of the trolley wheel on the wire 3. The wires 6 are maintained a fixed distance apart and from the trolley wire 3 by any suitable means. Fig. 3 shows a convenient means for so supporting the trolley and guide wires by means of a yoke 10 to which the guy wires 11 are connected which carry the trolley wire. By this means the trolley wheel is positively retained against lateral displacement on the trolley wire and the retaining means has no tendency to free itself from the retaining engagement, as is the case with the deep side flanges of the customary trolley wheel.

The device is simple and comparatively inexpensive as the guide wires 6 are not conducting wires, the current being carried entirely by the trolley wire 3.

Having now particularly described my invention, I hereby declare that what I claim as new and desire to be protected in by Letters Patent, is:

1. A trolley head, comprising the combination with a trolley wire having a guide wire below it on each side, of a trolley head secured to the trolley pole at an angle that will sustain that portion of the head within the side wires substantially vertical, a trolley wheel rotatably mounted in the upper end of the head and a side roller on each side of the head, the axis of each side roller at right angles to that of the trolley wheel.

2. A trolley head, comprising the combination with a trolley wire having a guide wire below it on each side, of a trolley head secured to the trolley pole at an angle that will sustain that portion of the head within the side wires substantially vertical, a trolley wheel rotatably mounted in the upper end of the head, said wheel having a circumferential groove at its mid-width and conically enlarged slightly toward each side, and a cylindrical roller mounted on each side of the head on an axis that is at right angles to that of the trolley wheel.

3. A trolley head, comprising the combination with a trolley wire having a guide wire below it on each side, of a trolley head secured to the trolley pole at an angle that will sustain that portion of the head within the side wires substantially vertical, a trolley wheel rotatably mounted in the upper end of the head, said wheel having a width greater than its diameter and a circumferential groove in its mid-width and a side roller rotatably mounted on each side of the head.

In testimony whereof I affix my signature in presence of two witnesses.

CLYDE W. WARNER.

Witnesses:
    ROWLAND BRITTAIN,
    MAY WHYTE.

---

Copies of this patent may be obtained for five cents each, by addressing the "Commissioner of Patents, Washington, D. C."